(12) United States Patent
Ben-Shachar et al.

(10) Patent No.: US 7,487,457 B2
(45) Date of Patent: Feb. 3, 2009

(54) APPLICATION SHARING SINGLE DOCUMENT SHARING

(75) Inventors: Ido M. Ben-Shachar, Sammamish, WA (US); Ivan J. Leichtling, Redmond, WA (US); Robert W. Schmieder, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 496 days.

(21) Appl. No.: 11/343,650

(22) Filed: Jan. 30, 2006

(65) Prior Publication Data

US 2006/0136837 A1    Jun. 22, 2006

Related U.S. Application Data

(62) Division of application No. 10/115,529, filed on Apr. 3, 2002.

(51) Int. Cl.
G06F 3/00 (2006.01)
G06F 15/16 (2006.01)

(52) U.S. Cl. .................. 715/753; 715/748; 715/810; 715/853; 709/204

(58) Field of Classification Search .......... 715/733, 715/738, 740, 748, 751, 753, 755, 759, 764, 715/765, 810, 205, 234; 709/204, 217; 707/1, 707/9, 10, 104.1
See application file for complete search history.

(56) References Cited

U.S. PATENT DOCUMENTS

| | | | |
|---|---|---|---|
| 4,386,416 A | 5/1983 | Giltner et al. |
| 4,631,521 A | 12/1986 | El-Sherbini |
| 4,672,459 A | 6/1987 | Kudo |
| 4,677,649 A | 6/1987 | Kunishi et al. |
| 4,783,834 A | 11/1988 | Anderson et al. |
| 4,814,987 A | 3/1989 | Miyao et al. |
| 4,823,122 A | 4/1989 | Mann et al. |
| 4,882,687 A | 11/1989 | Gordon |
| 4,897,799 A | 1/1990 | Le Gall et al. |
| 4,965,677 A | 10/1990 | Pennebaker et al. |
| 4,974,173 A | 11/1990 | Stefik et al. |
| 5,008,853 A | 4/1991 | Bly et al. |
| 5,057,916 A | 10/1991 | Krause et al. |
| 5,077,732 A | 12/1991 | Fischer et al. |

(Continued)

FOREIGN PATENT DOCUMENTS

WO    WO 99/26153    5/1999

OTHER PUBLICATIONS

U.S. Appl. No. 10/127,951, filed Apr. 23, 2002, Schmieder et al.

(Continued)

Primary Examiner—X. L Bautista
(74) Attorney, Agent, or Firm—Perkins Coie LLP (57) ABSTRACT

An improved application sharing system and method allow sharing of documents on a per document basis rather than on a per application basis, in order to simplify the user experience and to provide a more secure sharing environment. A window marking method is used to construct a window list describing the shared and unshared status of various windows. In an embodiment of the invention, a viewer machine displays only a most recently active shared document window even when other windows are also marked as shared. In this way, a viewer's attention can be automatically focused on a current document of interest.

20 Claims, 8 Drawing Sheets

U.S. PATENT DOCUMENTS

| | | |
|---|---|---|
| RE33,894 E | 4/1992 | Bradley |
| 5,172,103 A | 12/1992 | Kita et al. |
| 5,177,622 A | 1/1993 | Yoshida et al. |
| 5,179,711 A | 1/1993 | Vreeland |
| 5,206,934 A | 4/1993 | Naef, III |
| 5,210,825 A | 5/1993 | Kavaler |
| 5,241,625 A | 8/1993 | Epard et al. |
| 5,241,653 A | 8/1993 | Collins et al. |
| 5,255,361 A | 10/1993 | Callaway et al. |
| 5,287,203 A | 2/1994 | Namizuka |
| 5,298,992 A | 3/1994 | Pietras et al. |
| 5,319,463 A | 6/1994 | Hongu et al. |
| 5,390,262 A | 2/1995 | Pope |
| 5,404,436 A | 4/1995 | Hamilton |
| 5,408,600 A | 4/1995 | Garfinkel et al. |
| 5,485,559 A | 1/1996 | Sakaibara et al. |
| 5,491,780 A | 2/1996 | Fyles et al. |
| 5,550,968 A | 8/1996 | Miller et al. |
| 5,565,886 A | 10/1996 | Gibson |
| 5,608,872 A | 3/1997 | Schwartz et al. |
| 5,625,809 A | 4/1997 | Dysart et al. |
| 5,649,104 A | 7/1997 | Carleton et al. |
| 5,655,152 A | 8/1997 | Ohnishi et al. |
| 5,673,371 A | 9/1997 | Koopman et al. |
| 5,699,524 A | 12/1997 | Ooishi et al. |
| 5,717,856 A | 2/1998 | Carleton et al. |
| 5,727,155 A * | 3/1998 | Dawson ............. 709/205 |
| 5,754,873 A | 5/1998 | Nolan |
| 5,758,110 A | 5/1998 | Boss et al. |
| 5,760,769 A | 6/1998 | Petrie |
| 5,781,732 A | 7/1998 | Adams |
| 5,815,151 A | 9/1998 | Argiolas et al. |
| 5,826,051 A | 10/1998 | Porter et al. |
| 5,831,872 A | 11/1998 | Pan et al. |
| 5,835,713 A | 11/1998 | FitzPatrick et al. |
| 5,847,706 A | 12/1998 | Kingsley |
| 5,864,711 A | 1/1999 | Mairs et al. |
| 5,874,960 A | 2/1999 | Mairs et al. |
| 5,933,597 A | 8/1999 | Hogan |
| 5,938,724 A | 8/1999 | Pommier et al. |
| 5,949,435 A | 9/1999 | Brock et al. |
| 5,986,655 A | 11/1999 | Chiu et al. |
| 5,995,096 A | 11/1999 | Kitahara et al. |
| 6,008,804 A | 12/1999 | Pommier et al. |
| 6,025,871 A | 2/2000 | Kantor et al. |
| 6,057,835 A | 5/2000 | Sato et al. |
| 6,167,433 A | 12/2000 | Maples et al. |
| 6,173,315 B1 | 1/2001 | Deleeuw |
| 6,191,797 B1 | 2/2001 | Politis et al. |
| 6,212,547 B1 | 4/2001 | Ludwig et al. |
| 6,216,177 B1 | 4/2001 | Mairs |
| 6,219,044 B1 | 4/2001 | Ansberry et al. |
| 6,230,171 B1 | 5/2001 | Pacifici et al. |
| 6,275,223 B1 | 8/2001 | Hughes |
| 6,285,363 B1 | 9/2001 | Mairs et al. |
| 6,292,166 B1 | 9/2001 | Palmer et al. |
| 6,304,928 B1 | 10/2001 | Mairs |
| 6,317,777 B1 | 11/2001 | Skarbo et al. |
| 6,329,984 B1 * | 12/2001 | Boss et al. ............. 715/723 |
| 6,342,906 B1 | 1/2002 | Kumar et al. |
| 6,343,313 B1 | 1/2002 | Salesky et al. |
| 6,343,316 B1 | 1/2002 | Sakata et al. |
| 6,356,279 B1 | 3/2002 | Halstead, Jr. et al. |
| 6,380,940 B1 | 4/2002 | Halstead, Jr. et al. |
| 6,456,305 B1 | 9/2002 | Qureshi et al. |
| 6,460,126 B1 | 10/2002 | Spilo et al. |
| 6,469,716 B1 | 10/2002 | Carter et al. |
| 6,570,590 B1 | 5/2003 | Dubrow et al. |
| 6,577,330 B1 | 6/2003 | Tsuda et al. |
| 6,584,466 B1 * | 6/2003 | Serbinis et al. ............. 707/10 |
| 6,584,493 B1 | 6/2003 | Butler |
| 6,601,087 B1 | 7/2003 | Zhu et al. |
| 6,654,032 B1 | 11/2003 | Zhu et al. |
| 6,687,878 B1 | 2/2004 | Eintracht et al. |
| 6,697,846 B1 * | 2/2004 | Soltis ............. 709/217 |
| 6,823,514 B1 | 11/2004 | Degenerato |
| 6,825,860 B1 | 11/2004 | Hu et al. |
| 6,826,595 B1 | 11/2004 | Barbash et al. |
| 6,833,844 B1 | 12/2004 | Shiota et al. |
| 6,859,928 B2 * | 2/2005 | Wright ............. 718/102 |
| 6,910,188 B2 | 6/2005 | Keohane et al. |
| 6,911,987 B1 | 6/2005 | Mairs et al. |
| 6,925,645 B2 | 8/2005 | Zhu et al. |
| 6,973,627 B1 | 12/2005 | Appling |
| 6,982,729 B1 | 1/2006 | Lange et al. |
| 7,003,728 B2 * | 2/2006 | Berque ............. 715/753 |
| 7,046,253 B2 | 5/2006 | Long et al. |
| 7,127,460 B2 | 10/2006 | Nixon et al. |
| 2001/0000811 A1 | 5/2001 | May et al. |
| 2002/0010713 A1 | 1/2002 | Egilsson |
| 2002/0065919 A1 * | 5/2002 | Taylor et al. ............. 709/226 |
| 2002/0075304 A1 | 6/2002 | Thompson et al. |
| 2002/0078088 A1 | 6/2002 | Kuruoglu et al. |
| 2002/0095399 A1 | 7/2002 | Devine et al. |
| 2002/0174181 A1 | 11/2002 | Wei |
| 2002/0184310 A1 | 12/2002 | Traversat et al. |
| 2003/0028610 A1 | 2/2003 | Pearson |
| 2003/0085922 A1 | 5/2003 | Wei |
| 2003/0103088 A1 | 6/2003 | Dresti et al. |
| 2003/0137522 A1 | 7/2003 | Kaasila et al. |
| 2003/0140044 A1 * | 7/2003 | Mok et al. ............. 707/10 |
| 2003/0167339 A1 | 9/2003 | Zhu et al. |
| 2003/0189599 A1 | 10/2003 | Ben-Shachar et al. |
| 2003/0189601 A1 | 10/2003 | Ben-Shachar et al. |
| 2004/0024819 A1 | 2/2004 | Sasaki et al. |
| 2004/0066408 A1 | 4/2004 | Meyers et al. |
| 2004/0260717 A1 | 12/2004 | Albornoz et al. |
| 2005/0024389 A1 | 2/2005 | Mairs et al. |
| 2005/0027896 A1 | 2/2005 | Mairs et al. |
| 2005/0033817 A1 | 2/2005 | Wei |
| 2005/0055306 A1 | 3/2005 | Miller et al. |
| 2005/0216847 A1 | 9/2005 | Zhu et al. |
| 2006/0288389 A1 | 12/2006 | Deutscher et al. |

OTHER PUBLICATIONS

U.S. Appl. No. 10/153,501, filed May 22, 2002, Ben-Shachar et al.
U.S. Appl. No. 10/164,686, filed Jun. 6, 2002, Leichtling et al.
U.S. Appl. No. 10/859,640, filed Jun. 3, 2004, Mairs et al.
U.S. Appl. No. 11/187,048, filed Jul. 22, 2005, Ben-Shachar et al.
U.S. Appl. No. 11/187,111, filed Jul. 22, 2005, Ben-Shachar et al.
U.S. Appl. No. 11/344,361, filed Jan. 30, 2006, Ben-Shachar.
"A Primer on the T.120 Series Standard," DataBeam Corporation, pp. 1-13, 1995.
http://www.microsoft.com/windows/netmeeting/, Copyright 2005 Microsoft Corporation.
Intel Corporation, "Intel ProShare Personal Conferencing Software, Getting Started Guide," Intel Corporation, 1994, pp. 25-31.
Schroeder, Erica, "PictureTel Plans Low-Cost Video App Sharing," PC Week, vol. 11, No. 25, Jun. 27, 1994, pp. 1 & 171.
Schroeder, Erica, "Videoconferencing—Creative brings Mac package to Windows," Networking, PC Week, vol. 11, No. 25, Jun. 27, 1994, pp. 83 & 88.
Screen Dumps of Microsoft Word 2000, Jun. 10, 1999 (8 pages).
Gutekunst, Thomas et al., "A Distributed and Policy-Free General-Purpose Shared Window System," Oct. 6, 1994, Feb. 1995 IEEE/ACM Transactions on Networking, 13 pages.
Hao, Ming C., Alan H. Karp and Daniel Garfinkel, "Collaborative Computing: A Multi-Client Multi-Server Environment," COOCS'95, © 1995 ACM, pp. 206-213.

\* cited by examiner

| CLASS | SDI | MDI | MDI child window class |
|-------|-----|-----|------------------------|
| WORD  | X   |     | NA                     |
| EXCEL |     | X   | Exceldoc               |
| ...   | ... | ... | ...                    |
| ...   | ... | ... | ...                    |

FIGURE 8

APPLICATION SHARING SINGLE DOCUMENT SHARING

CROSS-REFERENCE TO RELATED APPLICATION

This application is a divisional of U.S. patent application Ser. No. 10/115,529 filed Apr. 3, 2002 entitled "APPLICATION SHARING SINGLE DOCUMENT SHARING," which application is incorporated herein in its entirety.

TECHNICAL FIELD

This invention relates generally to the technology of collaborative processing and, more particularly, relates to a system and method for processing and presenting shared documents over a network.

BACKGROUND OF THE INVENTION

As computers and computer networks become more pervasive in the home and workplace, many old methods for performing everyday tasks are being replaced or streamlined through the use of computer networking technology. For example, many employees are now able to have a virtual presence in their workplace by logging into a computer network maintained by their employer. One of the most striking developments in computer networking technology has been the advent of remote collaboration.

One of the oldest forms of processing data is the meeting or conference, whereby multiple individuals focus their attention on common subject matter to arrive at a joint decision, consensus, or product. Increasingly, such meetings are now taking place virtually over computer networks through the use of application sharing technologies. Such technologies enable a sharing user to share an application with various viewing users. The display produced by the application running on the sharer's computer is made available via a computer network to the viewers' computers. In some cases, the sharer may pass control of the application to a viewer, whereby the viewer's control inputs are then communicated back to the sharer's computer, where the actions associated with the inputs are executed, and the resulting changed display is shared back out to the viewers.

Although such systems are useful, and indeed critical to some users, application sharing systems remain fairly complex in their interface to users. In particular, an unsophisticated viewer may be confused or distracted by the presentation on his screen of the myriad of information associated with an application at a given moment, regardless of which window or item is currently being focused upon by the group. For example, if several document for the same application are shared out, a viewer may focus on a document that is interesting to him but that is not currently the subject of the collaborative effort. In addition, an unsophisticated sharer may share an application out to viewers without realizing that some windows of the application contain confidential or sensitive information that is not intended to be shared with the viewers.

A more simplistic and secure sharing experience is needed whereby a viewer's attention can be focused more directly on the document that is currently of concern, and whereby a sharer is not at risk of unknowingly sharing out confidential or sensitive information.

SUMMARY OF THE INVENTION

Application sharing can be understood as the use of a multipoint network program wherein the screen data and mouse movement of one endpoint, generally known as the sharer, is broadcast to and displayed on other endpoints, known as viewers. In some cases, the viewer may also exert control over a process corresponding to the displayed data. Typically, application sharing will either involve the sharing of the sharer's entire desktop or the windows and inputs corresponding to a specific process or processes.

To alleviate the problems inherent in prior application sharing technologies, the present invention generates a simplified viewer interface in an embodiment of the invention and a less complete sharing experience in a further embodiment. For example, a multiple document interface (MDI) parent window may be displayed in an embodiment of the invention only when specific MDI children are the forward document on the sharer's display. In a further embodiment of the invention, top-level windows in the same process are displayed in a mutually exclusive manner, so that two top-level parent windows, usually Single Document Interface (SDI) windows corresponding to a process, are not displayed simultaneously. In a further embodiment, a document associated with a process may be selected for sharing individually without sharing every document associated with that same process.

The mechanisms described herein for accomplishing the aforementioned behavior include in various embodiments of the invention mechanisms for marking windows and for reading the marks in order to properly display the appropriate windows. For example, a mechanism is described for marking windows so that the application sharing system will use a single document sharing presentation, either MDI or SDI type, when sharing the window. Furthermore, a mechanism is provided for marking MDI child windows under an MDI parent window to differentiate shared windows from unshared windows, and a system is described for reading the marks to properly display the appropriate windows to viewers. Further a process is described whereby a document associated with a certain process may be selected for sharing individually without sharing every document associated with that process.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention is primarily for use in a networked environment and may further be practiced in distributed computing environments where tasks are performed by remote processing devices that are linked through a communications network. In a distributed computing environment, program modules may be located in both local and remote memory storage devices.

Figure 1:
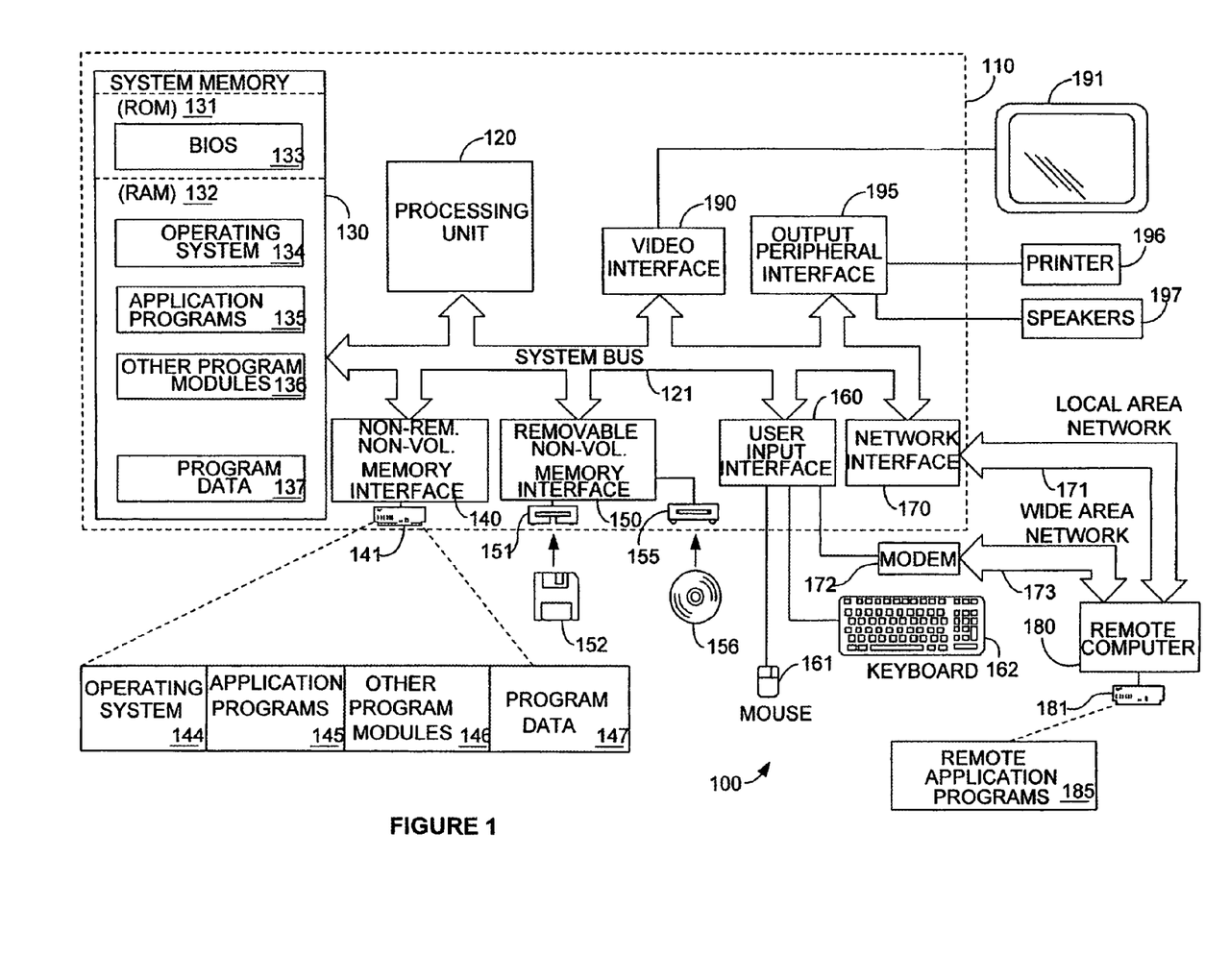
FIG. 1 is a block diagram generally illustrating an exemplary computer system usable in an implementation of the present invention.

FIG. 1 illustrates an example of a suitable computing system environment 100 usable in an implementation of the invention. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that are suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

An exemplary system for implementing the invention includes a general-purpose computing device in the form of a computer 110. Components of the computer 110 generally include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect. (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example only, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics (such as, for example, voltage or current level, voltage or current pulse existence or nonexistence, voltage or current pulse width, voltage or current pulse spacing, etc.) set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates RAM 132 as containing operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162, pointing device 161 (commonly referred to as a mouse), and trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

In the implementation of an embodiment of the invention, the computer 110 operates in a networked environment using logical connections to one or more remote computers, such as a remote computer 180. The remote computer 180 may be a personal computer, a router, a network PC, a peer device or other common network node, and in any case the remote computer or computers typically include many or all of the elements described above relative to the personal computer 110, although only a memory storage device 181 has been illustrated in FIG. 1. The logical connections depicted in FIG. 1 include a local area network (LAN) 171 and a wide area network (WAN) 173, but the computer 110 may additionally or alternatively use one or more other networking environments. Networking environments of all types are commonplace in offices, enterprise-wide computer networks, intranets and the Internet.

The computer 110 should include facilities for accessing the networks to which it is attachable. For example, when used in a LAN networking environment, the personal computer 110 is connected to the LAN 171 through a network interface or adapter 170. Another node on the LAN, such as a proxy server, may be further connected to a WAN such as the Internet. When used in a WAN networking environment, the computer 110 typically includes a modem 172 or other means for establishing communications directly or indirectly over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. It is not intended to limit the invention to use in a hard-wired network environment, since it may also be used in transiently connected environments, such as for example a wholly or partially wireless network environment interconnected wholly or partially via optical, infrared, and/or radio frequency wireless connections.

Herein, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
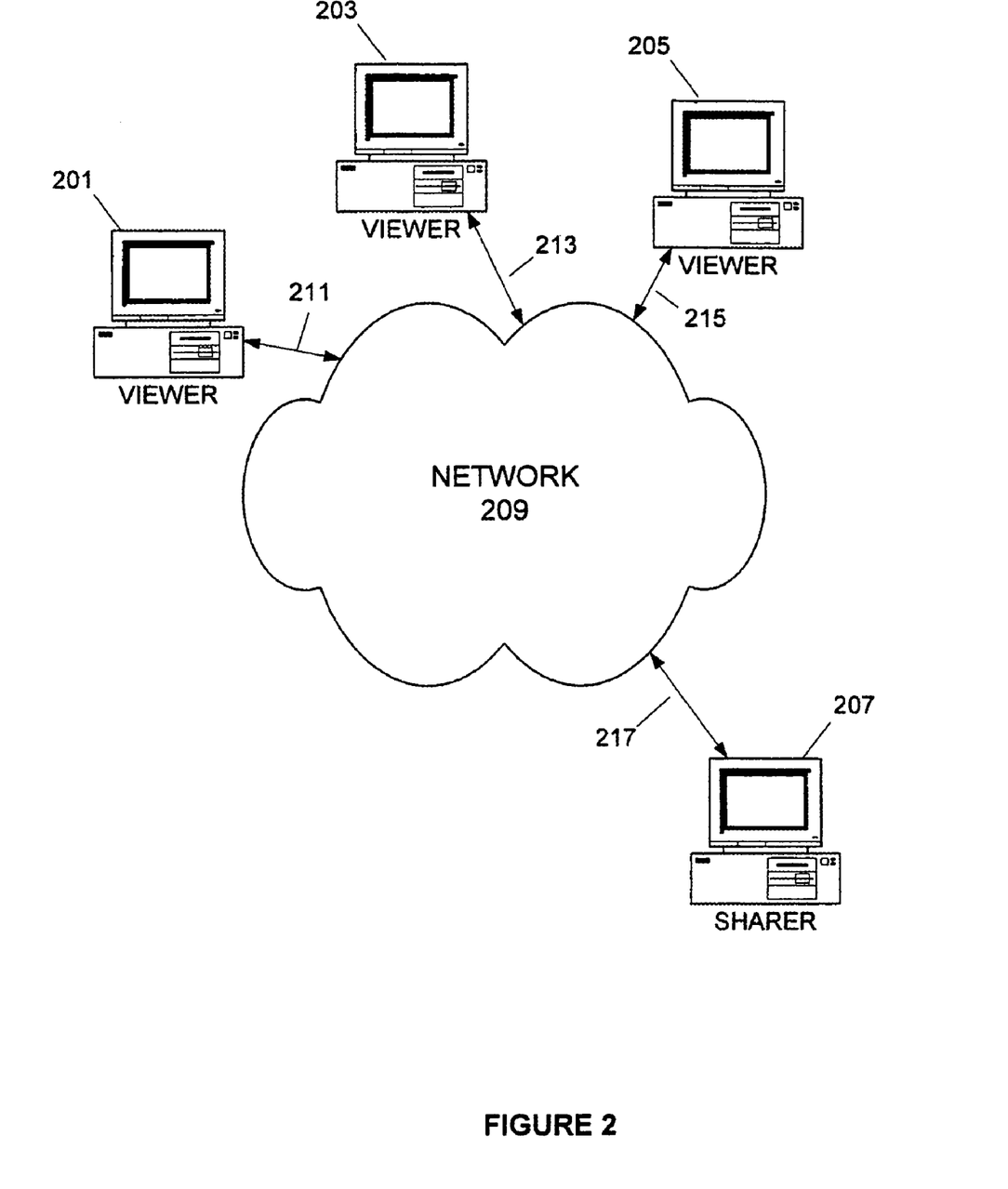
FIG. 2 is a schematic diagram showing the architecture of a network system within which an embodiment of the invention can be implemented, including multiple computers comprising a sharer computer and viewer computers.

FIG. 2 illustrates schematically a networking environment in which the present invention in preferably implemented. The architecture of such a system comprises one or more viewer computers illustrated as computers 201 203, and 205, connected to a sharer computer 207 via a network 209. Each computer 201, 203, 205, 207 is connected or connectable to the network 209 and hence to the others of computers. 201, 203, 205, 207 via network connections 211, 213, 215, and 217. The network connections 211, 213, 215, 217 and computers 201, 203, 205, 207 are as discussed above more generally with respect to FIG. 1. The network may be of any type, including, for example, a LAN, such as found in an office, university or other setting, a WAN such as the Internet, a MAN, or any other tangible or intangible, fixed or transient mechanism for computer interconnectivity. While higher data transfer rates are generally preferable to lower data transfer rates, there is no limit or requirement as to the speed of the network 209. In addition, the network 209 may be a single network, or alternatively may be comprised of multiple networks of the same or different types and/or speeds. It will be understood that in many but not all cases, the network will further comprise routers, servers, and/or other computing devices in addition to the endpoint devices 201, 203, 205, 207 involved in the collaborative effort.

Figure 3:
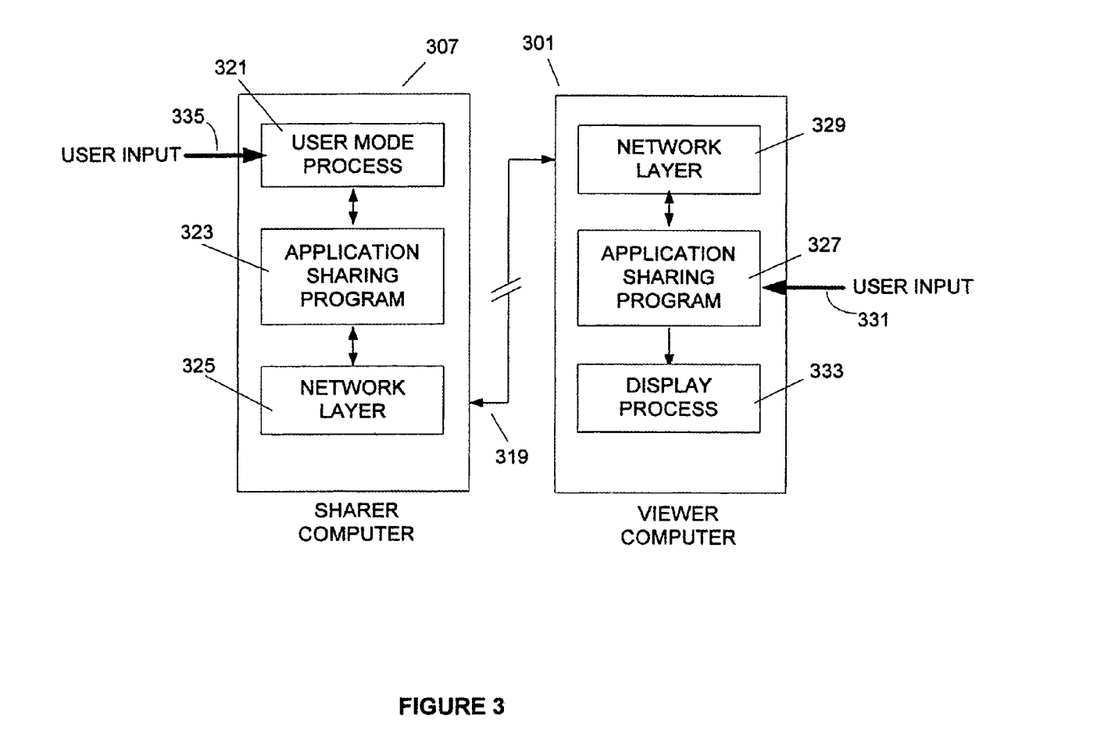
FIG. 3 is a schematic diagram illustrating in greater detail the placement and function of an application sharing program in an embodiment of the invention with respect to a sharer computer and a viewer computer.

Specific exemplary architectures of the sharer computer 207 and a viewer computer 201 are illustrated in greater detail schematically in FIG. 3. It will be understood that although only one viewer computer is illustrated in FIG. 3, there can be more than one such computer in an implementation of the invention, as illustrated by way of FIG. 2. Sharer computer 307 is illustrated as being connected via networking connection 319 to viewer computer 301. As will be appreciated by those of skill in the art, network connection 319 can include some or all of the network types and network connections discussed above, as well as other network types and connections alternatively or additionally.

A user mode process of interest 321 is running on sharer computer 307. Such a process is any process, such as a program, from which information is being shared to one or more viewers such as viewer 307. The process of interest 321 will be referred to hereinafter as the shared process, with the understanding that the information generated by the process 321 need not be shared completely. That is, the information shared may consist of a subset of the information generated by the process 321. The shared process will often be a process that can also be used in a non-shared manner. For example, a word processing program may be used by the sharer for non-collaborative document production, and may then be used in a shared manner for group editing of the same or another document. In either mode, the process 321 and the operating system of the sharer computer 307 perform certain steps. For example, whether or not the process 321 is shared, the output of the process 321 will still generally be output to the graphics display driver of the sharer computer 307.

If the application sharing program 323 is active, such as during a sharing session, then other processes unique to the collaborative setting also take place. In particular, the application sharing program 323, which is communicably linked to the process 321, receives information from the process 321 and transfers information to the process 321. Although the bi-directional flow of information between the process 321 and application sharing program is illustrated by a double arrow, note that the mechanisms for transfer may vary depending upon direction. For example, the process 321 need not even be aware of the presence or operation of the application sharing program 323 for the application sharing program 323 to receive information from the process 321.

Typically, the application sharing program 323 is communicably linked to an interceptor filter placed in the display path for the process 321. Such a filter may be placed just before the graphics device interface (GDI) or similar interface in such a manner as to read, in a non-intrusive manner, all information sent to the screen of computer 307 by the process 321. In the WINDOWS operating system produced by MICROSOFT of Redmond, Wash., when an application wants to display an object, it calls a GDI function and sends the various parameters for the object. In turn, the GDI sends commands to the screen to cause it to actually display the object. In contrast, the mechanism for transferring information from the application sharing program 323 to the process 321 need not involve the display path at all, and may instead involve a direct transfer of information.

Regardless, the application sharing program 323 is also communicably linked to the networking facilities 325 of the sharer computer 307. Such facilities 325 may include any networking communications stack or other protocol arrangement as well as the hardware required for accessing the network connection 319, as discussed above with respect to FIG. 1. Across the network connection 319, a counterpart application sharing program 327 running on the viewer computer 307 is communicably linked to the sharer computer 307 via the network connection 319 and the networking facilities 329 of the viewer computer. The networking facilities 329 may be similar to the networking facilities 325 of the sharer computer. The counterpart application sharing program 327 receives input from shared process 321 via the network connection 319 and also potentially from a user of the viewer computer 301, via one or more input channels 331, such as a keyboard, mouse, etc. as discussed above with respect to FIG. 1. Additionally, the counterpart application sharing program 327 outputs material for display to a display process 333 such as a GDI or similar interface, or other display process. Note that the sharing computer also preferably includes input channels 335 such as those described above for receiving user input, some of which may be directed to and received by the process of interest 321.

The general operation of the architecture and components illustrated in FIG. 3 will be described briefly in overview before giving a detailed exposition of the processes involved in embodiments of the invention. Initially the shared process 321 is running on sharer machine 307, and is processing one or more documents. The user of the sharer machine 307 can begin execution of the application sharing program 323 by selecting an icon on the display screen of machine 307 or otherwise. Preferably, upon prompting by the user either via start-up of the application sharing program 321 or by selection of an option during execution of the application sharing program 321, the user of sharer machine 307 is presented with a list of all sharable documents currently open on machine 307, including those being processed by process 321. The user may select documents to be shared as well as a viewer with whom the documents will be shared.

The application sharing program 327 resident on the viewer machine 329 should be running before actual sharing of documents is attempted, and may be run in the same manner as described above. At this point, document sharing may occur. That is, of all the documents selected as shared by the user of sharer machine 307, data corresponding to the shared window that is currently active on sharer machine 307 is transmitted to the viewer computer 301 for display on the screen or display device of that computer 301 in an embodiment of the invention.

Figure 4:
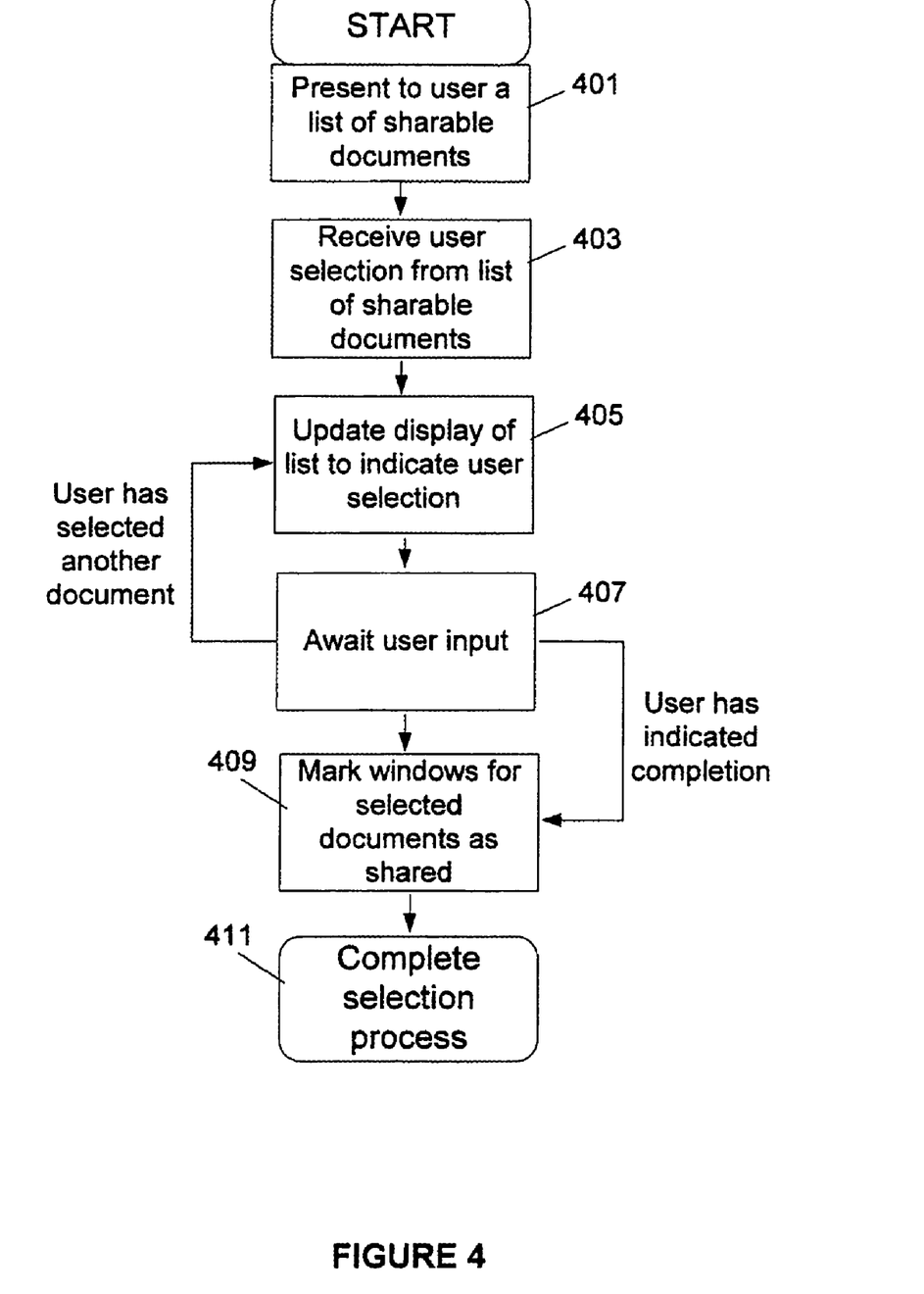
FIG. 4 is a flow chart illustrating a process usable in an embodiment of the invention to complete user selection of shared documents.

The flow chart illustrated in FIG. 4 sets forth the process executed on the sharer machine 307 to designate shared content for transmission. As shown in step 401, the application sharing program running on the sharer machine presents to the user a list of documents that may be shared. The presentation of the list in one embodiment is initiated by the user, such as by moving a cursor over an appropriate icon and clicking a mouse or other indicator. In an alternative embodiment, a current list of all documents is maintained in a window on the screen, either as a visible window or a minimized window represented by an icon such as in a task bar at the periphery of the screen. In another embodiment, presentation of the list is automatic, occurring for example, each time a new sharable window is created. This may happen when a new process is run or when a new document is opened within an existing process. Note that certain document types or window types should generally not be sharable for reasons of practicality. For example, it is possible but generally not desirable to share a pop-up window that announces a particular state or occurrence. Nor will it generally be desirable to share administrative windows. Thus, those of skill in the art will appreciate that there exist a number and variety of windows that it may desirable in an implementation to treat as not sharable.

Figure 5A:
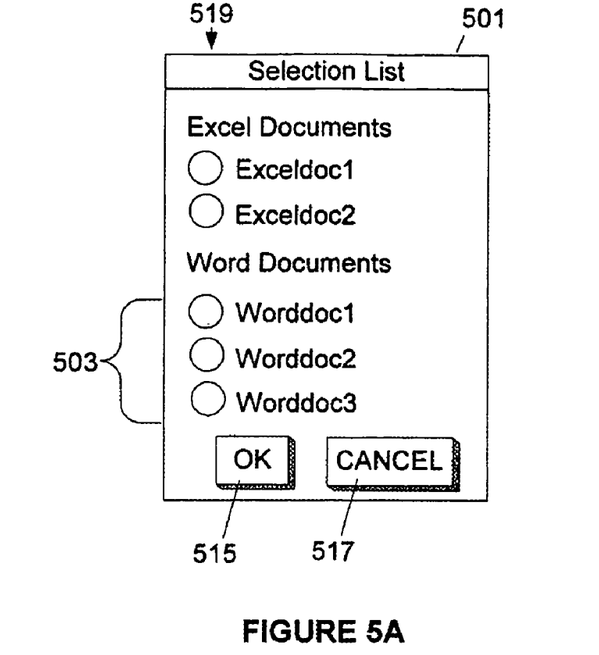
FIGS. 5A and 5B are schematic diagrams of a user interface for listing sharable documents and for allowing user selection of documents to be shared in an embodiment of the invention.

FIG. 5a shows one presentation of a list 501 of sharable documents in an embodiment of the invention. Note that documents associated with the same process may be grouped spatially, as with the group 503 of documents associated with the application MICROSOFT Word produced by MICROSOFT Corporation of Redmond, Wash. As discussed above, the list 501 preferably omits documents that are not sharable, if any.

In step 403, a user of the sharer machine makes a selection from the presented list of sharable documents, which selection is received by the application sharing program. Unlike prior systems, it is possible for the user to select some documents associated with a process while not selecting other documents associated with the same process. In this manner, the sharing of documents is explicit from the sharer's viewpoint, thus eliminating the danger of accidentally sharing an unselected document simply because it is associated with the same process as a selected document.

Figure 5B:
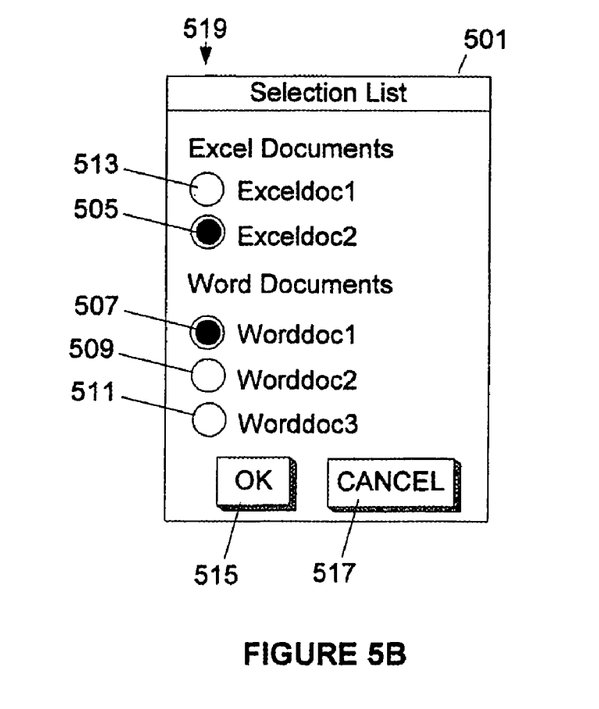

In step 405, the application sharing program updates the display of list 501 to indicate the user's selection, and then transitions to step 407 where it waits for further user input. If from step 407 a user selection of another document is detected, the process flows back to step 405 to update the display of the list, and then follows the steps that logically follow from that step. FIG. 5*b* illustrates the list 501 of FIG. 5*a* after the user has made a selection. As illustrated, the user has elected to share the document worddoc1 507 and exceldoc2 505. Note that the remaining documents worddoc2 509 and worddoc3 511 associated with the MICROSOFT Word application and the remaining document exceldoc1 513 are not selected and will not be shared with a viewer. Note that the user may select any number of documents up to the number of sharable documents presented in the list 501. The user may also choose to share no documents at all.

If from step 407 it is determined that the user has indicated completion of the selection process such as by activating the "OK" button 515, then the process flows to step 409, where it marks the windows for the selected documents as shared and then completes at step 411. Note that the user is preferably able to cancel the document selection process and, in an embodiment of the invention, remove the list presentation from the display at any time during the process by selecting an appropriate indicator, such as the "cancel" button 517. Furthermore, in an embodiment, the list may be changed by the application sharing program during the selection process if a new window is opened. Alternatively, a user may be prevented from opening new windows during the selection process, or windows so opened may not be added to the list.

The user is preferably able to deselect any selected document during the selection process, and the display of the sharable document list is preferably modified in such a case to indicate that the relevant item is no longer selected for sharing. Selection and deselection may entail the user placing the cursor over and clicking on a select field 519 adjacent to each document name in the list 501.

The marking of selected documents, as referenced above in the discussion of the selection process, is preferably accomplished by associating an item of information with the window of interest. In an embodiment, a global atom is used to mark a window as shared. As will be appreciated by those of skill in the art, an atom is an integer that identifies a character string, or atom name, in an atom table. The atom table is defined by the operating system to store character strings and their associated atoms. A global atom table is available to all applications, whereas a local atom table can be used only by the application that created it.

In addition to enabling the document-by-document selection of documents to be shared, the invention additionally or alternatively enables, in an embodiment, a single document viewer interface. That is, a most recently active shared window is identified, and although there may be other shared windows, the viewer display shows only the most recently active shared document window. In order to facilitate the aforementioned function in an embodiment of the invention, each window is marked by an additional mark, or atom, as will described in greater detail below.

There exist multiple different types of user interfaces supported by applications that use a graphical display. The two primary types are Single Document Interface (SDI) and Multiple Document Interface (MDI). An SDI application allows the display and manipulation of only one document at a time. SDI applications may require the user to reload the application for each document to be worked on concurrently. An MDI application allows the display and manipulation of more than one document at the same time. Typically there is only one instance of an MDI application running even when multiple documents associated with that application are being displayed. MICROSOFT Word by MICROSOFT Corporation of Redmond, Wash. is an example of an SDI application while MICROSOFT Excel also by MICROSOFT Corporation is an example of an MDI application.

In an embodiment of the invention, in addition to being marked as shared, each window is marked, again using a global atom, for single document sharing, meaning that only one document according to a currently active process will be shared if that is the current document, and that with respect to MDI applications, only the forward child window will be shared. With respect to an MDI application, if document-by-document sharing is enabled as described above, then each child window is preferably also marked as shared if the window has been selected to be shared. Thus, whether an SDI or MDI application is associated with the current active shared window, only that window will be shared in an embodiment of the invention.

The following discussion sets forth in greater detail the manner in which windows are marked with these additional marks, and the manner in which the windows list of shared windows is constructed using these marks. Referring to the flow chart of FIG. 6, the steps taken in an embodiment of the invention to mark a window or its top level parent window with a single document mark via an atom are shown. The illustrated process is initiated whenever a document is created or whenever a document is changed from non-shared to shared status via the process described above with references to FIGS. 4 and 5 or otherwise. The illustrated process can be executed by the application sharing program, or by another process or program such as the shared application itself.

Figure 6:
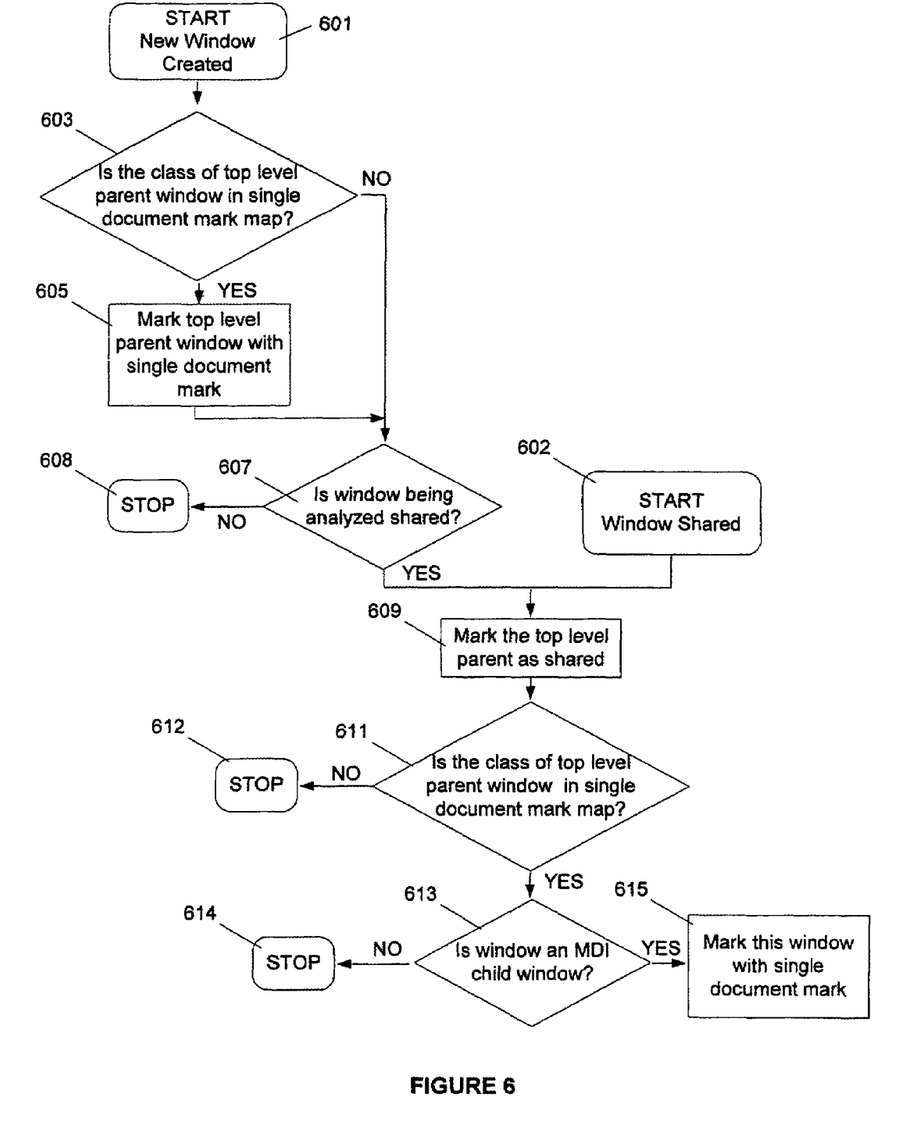
FIG. 6 is a flow chart illustrating a process for marking windows with a single document mark or a shared mark, according to an embodiment of the invention.
Figure 8:
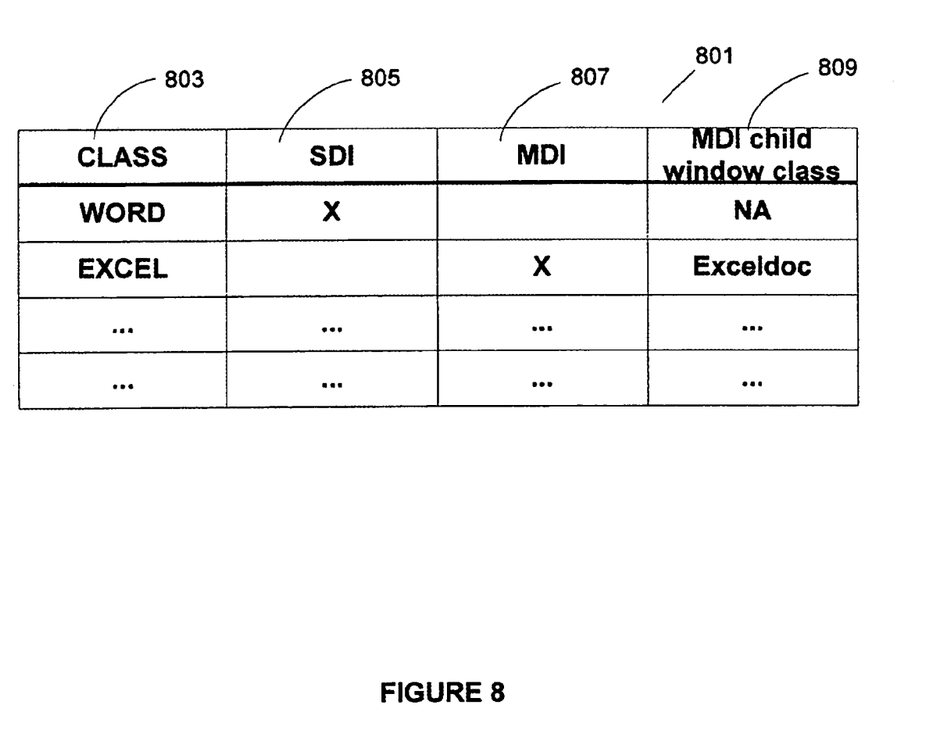
FIG. 8 is a data structure diagram corresponding to a single document mark map according to an embodiment of the invention.

When the process is initiated by the creation of a new window, it commences at node 601 and progresses to decision 603. At decision 603, the process determines whether the class of the top level parent window of the window being analyzed is found in a single document mark map. The single document mark map identifies all classes that are known to be associated with either of an SDI or MDI application. An exemplary single document mark map 801 usable in an embodiment of the invention is illustrated in FIG. 8. The map preferably lists each such class in a field 803, having associated fields 805, 807 containing an indication of which type of application supports the particular window class. For example, in the exemplary map 801 of FIG. 8, the "word" class of windows is associated with an SDI application (MICROSOFT Word), while the "excel" class of windows is associated with an MDI application (MICROSOFT Excel). Note that the exact structure of the single document mark map is not critical, and the information that a particular class is or is not associated with a particular type of application may be conveyed in the map in any way, such as by placing a "1" or "0" in the appropriate field, or otherwise. Note that for the MDI case, the map 801 should further contain a field 809 for identifying the window class of the MDI child windows.

In an embodiment of the invention, the map is pre-populated with the pertinent information. However, it is possible that applications unknown to the producer of the map may also be designed to take advantage of single document sharing. Therefore, these applications can preferably register information to be added to the map. Thus the map may be continually expanded to account for additional applications as needed. One implementation of such a registration process using the WINDOWS brand operating system produced by MICROSOFT CORPORATION of Redmond, Wash. is to allow applications to add a specific set of registry keys into a predetermined location in the WINDOWS registry. These keys would contain the data needed to describe the application's characteristics for entry in the map 801. When the application sharing program starts on the sharer's machine, these entries are read from the registry and added to the map 801.

If at step 603 it is determined that the top level parent window of the window being analyzed is in the single document mark map, then at step 605, the process marks the top level parent window with a single document mark. The single document mark, preferably an atom, contains information regarding whether the window is associated with an SDI or MDI application. For MDI applications, the single document mark also serves as a key into a map of information about the particular MDI application, such as window class name for the document windows of the application. Note that the single document mark is preferably added to the relevant windows by the application sharing program, but may alternatively be added by the application itself in an embodiment of the invention. In that embodiment, a small API set is exposed to external applications by the application sharing program, so that the external application can place the single document mark on the windows that it creates where appropriate. Further in this embodiment, an external MDI application can preferably register the windows class of its document windows via the application sharing program. If instead at step 603 it is determined that the top level parent window of the window being analyzed is not in the single document mark map, then the process bypasses step 605 and proceeds directly to step 607.

It is determined at step 607 whether the window being analyzed is shared. In particular, a window that is currently to be shared will be have been accordingly marked via a global atom as discussed above with respect to FIG. 4. If the window being analyzed is not marked as shared, the process terminates at node 608. If instead the window being analyzed is marked as shared, then the process flows to step 609. Also note that when an existing window is first selected for sharing, such as according to the process of FIG. 4, the process of FIG. 6 is entered from node 602, which also proceeds then to step 609.

Regardless of the route followed to arrive at step 609, the process marks the analyzed window's top level parent as shared at that step, and then proceeds to step 611. At step 611, a procedure analogous to that of step 603 is carried out. In particular, it is determined at step 611 whether the class of the top level parent window of the window being analyzed is found in the single document mark map. If it is determined at this step that the class of the top level parent window of the window being analyzed is not found in the single document mark map, then the process terminates at node 612. If it is determined instead at this step that the class of the top level parent window is found in the single document mark map, then the process continues to step 613.

At step 613, it is determined whether the window under analysis is an MDI child window. If it is determined that the window under analysis is not an MDI child window, then the process terminates at node 614. If instead it is determined that the window under analysis is an MDI child window, then the process proceeds to the final step 615. At step 615, the window being analyzed is marked with a single document mark. Similar to the other marking processes described above, this marking is accomplished by way of a global atom in an embodiment of the invention.

It can be seen that after completion of the process described with respect to FIG. 6, several different window markings may have been made depending upon the nature of the window under analysis as well as its top level parent's window class. In particular, the current window may have been marked with a single document mark. Additionally, the top level parent may have been marked with a single document mark and in some cases a shared mark. In the following discussion, a method of using these window markings to populate a windows list that identifies shared and unshared windows will be described according to an embodiment of the invention.

Figure 7:
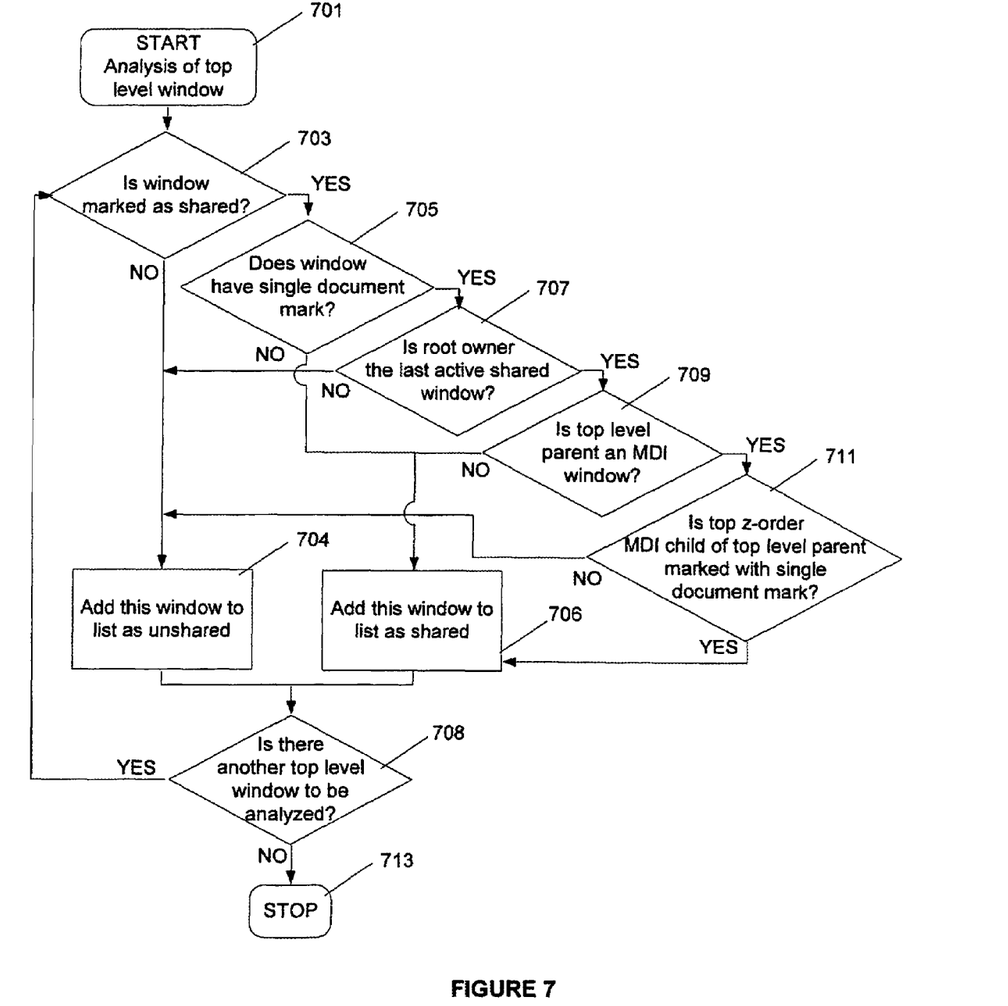
FIG. 7 is a flow chart illustrating a process according to an embodiment of the invention for constructing a window list of shared and unshared documents.

Referring to the windows list construction process illustrated in FIG. 7, the process begins at node 701 with respect to a top level window under analysis and proceeds to decision 703. At decision 703, the process determines whether the top level window under analysis is marked as shared. The processes whereby a window may be marked as shared are discussed above, primarily with respect to FIGS. 4 and 6. If it is determined at decision 703 that the top level window under analysis is not marked as shared, then the process continues to step 704 whereat the top level window under analysis is added to the window list as unshared. It will be understood that the step of adding a window to the window list as shared or unshared entails adding information to the windows list, which information identifies the window and also identifies a status of the window as shared or unshared as appropriate.

From step 704, the process of constructing the window list proceeds to decision 708, at which point it is determined whether there is another top level window to be analyzed that has not yet been processed. If there is no other top level window left to be analyzed, the window list construction process terminates at node 713. If instead there is another top level window left to be analyzed, the process moves from decision 708 back to 703 to execute steps 703 and the steps that logically follow anew for the window that is still to be analyzed.

If at step 703 it is instead determined that the current top level window under analysis is marked as shared, then at step 705 it is determined whether the window has a single document mark. If it is determined at step 705 that the top level window under analysis does not have a single document mark, then at step 706, the top level window under analysis is added to the window list as shared, and the process continues to step 708 and the steps that logically follow. If it is instead determined at step 705 that the top level window under analysis does have a single document mark, then at step 707 the process determines whether the root owner of the window under analysis is the last active shared window. In other words, although there may be a number of documents that the user has selected to share, only one of those documents is the active shared window at any given time in an embodiment of the invention.

If at step 707 it is determined that the root owner of the window under analysis is not the last active shared window, then the process adds the window under analysis to the window list as unshared at step 704 and executes the steps that logically follow. If instead it is determined at step 707 that the root owner of the window under analysis is the last active shared window, then the process flows to step 709, whereat it is determined whether the top level parent of the window under analysis is MDI window, i.e. whether it is associated with an MDI application. If it is determined at step 709 that the top level parent of the window under analysis is not an MDI window, then the process adds the window under analysis to the window list as shared at step 706 and executes the steps that logically follow. If instead it is determined at step 709 that the top level parent of the window under analysis is an MDI window, then the process moves to step 711.

At step 711, it is determined whether the top z-order MDI child of the top level parent is marked with the single document mark. If it is determined that the top z-order MDI child of the top level parent is marked with the single document mark, then the process adds the window under analysis to the window list as shared at step 706 and executes the steps that logically follow. If instead it is determined that the top z-order MDI child of the top level parent is not marked with the single document mark, then the window under analysis is added to the window list as unshared at step 704 and the process executes the steps that logically follow.

In addition to the window list that is constructed as described above, an order packet is also periodically generated to allow the viewer to accurately construct the shared view. In particular, the drawing commands collected from the chained display driver process described earlier are periodically packaged in an order packet that is sent to the viewer machine along with the window list. The viewer machine uses the order packets to construct a hidden picture of the sharer's display, and then analyzes the information in the window list to determine what portions of the hidden picture to reveal to the viewer. For this purpose, the window list contains an indication of the regions of the screen that each window covers, the title of the each window, and an indication as to whether each window is shared or unshared as described above with reference to FIGS. 4, 6 and 7.

From the above discussion, it be seen that the invention provides a more secure sharer experience in an embodiment, as well as a more simplified viewer experience in another aspect. For example, when the sharer has on its display windows corresponding to shared documents and windows corresponding to unshared documents, the aforementioned processes result in a document-centric viewing experience whenever possible. The unshared windows will of course not be displayed at the viewer, and several shared windows may also not be displayed. If there are multiple shared windows, generally only the current or most recently active shared window will be displayed. However, when the top-level parent of a shared window does not support single document display, i.e. when the corresponding application is not found in the single document mark map, then in an embodiment of the invention that shared window will be displayed even when it is not the current active window on the sharer.

The resultant viewer experience is that, with the exceptions noted above, the viewing user generally sees a single shared window. The viewing user need not try to track which of many displayed shared windows is the current active window, because their attention is always focused on the current active shared window and its contained document. If the most recently active shared window on the sharer changes, the displayed window on the viewer machine is replaced by the current most recently active shared window.

However, even if all of the applications associated with presently shared documents are listed in the single document mark map, not all new windows will replace the current window on the viewer display. For example, if a shared window parents a pop-up window, such as a dialog box or menu, both windows will preferably be displayed at the viewer. Thus, in general terms, for a single document interface application, the display protocol used at the viewer is to display the top-most window marked as shared, and its children. As well, the viewer may display any other shared window not marked with the single document mark. For a multiple document application whose parent window is marked with the single document mark, the protocol is to show the parent window and the top-level child if the top-level child is marked as shared, and otherwise to not show either the parent or child. If a window appears to be an MDI parent but is not explicitly marked with the single document mark, then all shared children are nonetheless shown simultaneously to the extent they are visible at the sharer.

Typically, an API query is used to determine the top z-order MDI child. However, it may be computationally expensive to repeatedly recompute the order of the children windows to find the top z-order child. Thus, in an embodiment of the invention, the identity of the top z-order child is stored for future reference if the child z-order has not changed, such as in another atom associated with the parent window.

It will be appreciated from the above discussion that the application sharing program performs its tasks only when it is running. Thus, when application sharing is started up, it may be that numerous windows exist already that need to be analyzed and possibly marked according to the aforementioned processes. For processes associated with one or more windows, none of which are marked or selected as shared, the application sharing program may not mark the windows with any marks, including the single document mark, since none will be shared. However, once one window associated with a process is marked or selected as shared, the application program preferably treats all windows associated with that process according to the marking rules described above.

Note that for MICROSOFT brand Office application windows, a task bar item may be created for each document associated with an MDI parent window. A child window can be moved to the top in z-order by activating the associated task bar item. In an embodiment of the invention, this mechanism is used to shift the display at the viewer.

All of the references cited herein, including patents, patent applications, and publications, are hereby incorporated in their entireties by reference. That is, each and every part of every such reference is considered to be part of this disclosure, and therefore no part of any such reference is excluded by this statement or by any other statement in this disclosure from being a part of this disclosure.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Furthermore, although network connections are illustrated herein as lines, no limitation should thereby be imparted to the invention. Network connections may be circuit-switched, packet-switched, or otherwise, and may be transient or permanent, hard-wired or wireless, operating via any suitable protocol. Also note that although embodiments of the invention have been described largely by reference to a sharing program that is separate from the shared process, the sharing program may not be a stand alone program, but may be an integral part of the shared process itself, or may be a DLL or other in-process entity. Therefore, the invention as described herein contemplates all such embodiments as may come within the scope of the following claims and equivalents thereof.

We claim:

1. A method performed by a sharer computer for analyzing a first window associated with an application executing on the sharer computer, comprising:

determining whether a class of a top level parent window of the first window is listed in a map of classes known to be associated with an application of a type selected from the group consisting of single document interface and multiple document interface application types;

marking the top level parent window to signify that its class is listed in the map of classes, if it is determined that the class of the top level parent is listed in the map of classes;

determining whether the first window has been marked as a window that is to be shared and if the first window has been marked as a window that is to be shared, determining whether the first window is a child of a parent window that is associated with a process using a multiple document interface; and marking the first window with a single document mark to signify that it is a child of a parent window that is associated with a process using a multiple document interface, if it is determined that the first window is a child of a parent window that is associated with a process using a multiple document interface, so that the first window is shared but other windows of the process are unshared.

2. The method of claim 1 further comprising constructing a window list containing an indication of an identity of at least one window and an indication of whether the at least one window is to be shared with a viewer computer communicably connected to the sharer computer, the constructing the window list further comprising:

determining whether a first top level window is marked to be shared;

adding an identification of the first top level window to the window list and associating with the identification of the first top level window an indication that the first top level window should not be displayed on the viewer computer, if it is determined that the first top level window is not marked to be shared;

if it is determined that the first top level window is marked to be shared, determining whether the first top level window is marked as being associated with an application of a type selected from the group consisting of single document interface and multiple document interface; and adding an identification of the first top level window to the window list and associating with the identification of the first top level window an indication that the first top level window should be displayed on the viewer computer if it is determined that the first top level window is not marked as being associated with an application of a type selected from the group consisting of single document interface and multiple document interface.

3. The method of claim 2, further comprising:

determining whether a root owner of the first top level window is the most recently active shared window, if it is determined that the first top level window is marked as being associated with an application of a type selected from the group consisting of single document interface and multiple document interface;

if it is determined that the root owner of the first top level window is not the most recently active shared window, adding an identification of the first top level window to the window list and associating with the identification of the first top level window an indication that the first top level window should not be displayed on the viewer computer, and otherwise determining whether a top level parent window associated with the first top level window is associated with an application supporting a multiple document interface;

if it is determined that a top level parent window associated with the first top level window is not associated with an application supporting a multiple document interface, adding an identification of the first top level window to the window list and associating with the identification of the first top level window an indication that the first top level window should be displayed on the viewer computer, and otherwise identifying a top child window of the top level parent window having a highest z-order value compared to all children of the top level parent window; and determining whether the top child window is marked as being associated with an application of a type selected from the group consisting of single document interface and multiple document interface, and adding an identification of the first top level window to the window list and associating with the identification of the first top level window an indication that the first top level window should be displayed on the viewer computer if the top child window is marked as being associated with an application of a type selected from the group consisting of single document interface and multiple document interface, and otherwise adding an identification of the first top level window to the window list and associating with the identification of the first top level window an indication that the first top level window should not be displayed on the viewer computer.

4. A computer-readable storage medium storing computer-executable instructions for performing a method of sharing a window of an application associated with a sharer computer with viewer computer, comprising:

receiving an indication that a child window of an application was created;

determining whether a class of an application associated with the child window is listed in a single document mark map, the single document mark map associating application classes with interface types; and when the child window uses a multiple document interface, marking the child window with a single document mark so that the child window is shared but another child window of the application that is not marked with the single document mark is unshared.

5. The computer-readable storage medium of claim 4 wherein an interface type is a single document interface.

6. The computer-readable storage medium of claim 4 wherein an interface type is a multiple document interface.

7. The computer-readable storage medium of claim 4 further comprising indicating that a top level window associated with the application is listed in the single document mark map by marking with a single document mark the top level window.

8. The computer-readable storage medium of claim 4 further comprising sharing the child window when it is marked with a single document mark.

9. The computer-readable storage medium of claim 4 further comprising storing the single document mark in a global atom.

10. The computer-readable storage medium of claim 4 wherein when the child window uses a single document interface, the child window is not marked with the single document mark.

11. The computer-readable storage medium of claim 10 wherein the child window is shared.

12. The computer-readable storage medium of claim 4 further comprising sharing the child window when it is a top child window in a z-order list of child windows of the application and the application is marked with a single document mark.

13. The computer-readable storage medium of claim 12 wherein the application has a multiple document interface.

14. The computer-readable storage medium of claim 4 wherein when the child window has a single document mark and a root owner of the child window is not the last active shared window, the child window is not shared.

15. The computer-readable storage medium of claim 14 wherein when a top level parent window of the child window does not have a multiple document interface, the child window is marked as shared.

16. A system for sharing a window of an application from a sharer computer to a viewer computer, comprising:
   a component that receives from a user an indication of a child window of an application that is to be shared;
   a component that determines whether a class of a top-level parent window associated with the child window appears in a single document mark map, the single document mark map for associating parent window classes with interface types and child window types; and
   a component that shares the child window from the sharer computer to the viewer computer when the application has a multiple document interface and the child window is a top child window of the application.

17. The system of claim 16 wherein the single document mark map indicates that the class of a top-level parent window has a multiple document interface type.

18. The system of claim 17 wherein the child window is the top window of the application when it is highest in a z-order list of child windows of the application.

19. The system of claim 16 wherein the single document mark map indicates that the class of a top-level parent window has a single document interface type.

20. The system of claim 16 wherein the child window is shared when the interface type of the application is a single document interface type.

* * * * *